United States Patent [19]

Matzner et al.

[11] 3,860,465

[45] Jan. 14, 1975

[54] METHOD FOR OBTAINING AN ACCURATELY DETERMINED HIGH RESISTANCE IN A RESISTOR PRODUCED IN A SINGLE CRYSTALLINE SUBSTRATE

[75] Inventors: Eva Matzner, Stockholm; Olaf Sternbeck, Bromma, both of Sweden

[73] Assignee: Telefonaktiebolaget L M Ericsson, Stockholm, Sweden

[22] Filed: Feb. 1, 1973

[21] Appl. No.: 328,515

[30] Foreign Application Priority Data

Feb. 15, 1972 Sweden .............................. 1790/72

[52] U.S. Cl. .......................... 156/8, 156/17, 357/51

[51] Int. Cl. .............................................. H01l 7/50

[58] Field of Search .............. 156/3, 8, 17; 148/187; 29/590, 610, 621; 308/338, 339; 317/234, 235

[56] References Cited

UNITED STATES PATENTS

| | | | |
|---|---|---|---|
| 3,432,920 | 3/1969 | Rosenzweig | 117/212 X |
| 3,764,409 | 10/1973 | Nomura et al. | 156/17 X |

OTHER PUBLICATIONS

IBM Technical Disclosure Bulletin, Vol. 14, No. 7, Fabrication of Switchable Resistor/Schottky Barrier Memory Cell by Anacker et al., Dec. 1971, pp. 2151–2153, Relied upon.

*Primary Examiner*—William A. Powell
*Attorney, Agent, or Firm*—Hane, Baxley & Spiecens

[57] ABSTRACT

The invention refers to a method for obtaining an accurately determined high resistance in a resistor produced in a single crystalline substrate in the form of a diffused region limited in length, width and depth direction, which region is covered with an oxide layer and is provided with a first and a second window in the oxide layer for connection of two terminal contacts. According to the invention, a third window is made in the oxide layer on the top of the diffused region by means of a conventional photo-resist and etching technique whereupon the diffused region is etched in the depth direction through the third window for a predetermined time period during which such a quantity of material is removed that the resistance of the quantity of material remaining in the diffused region, measured between the first and second window, will be equal to a predetermined resistance value.

5 Claims, 4 Drawing Figures

METHOD FOR OBTAINING AN ACCURATELY DETERMINED HIGH RESISTANCE IN A RESISTOR PRODUCED IN A SINGLE CRYSTALLINE SUBSTRATE

This invention refers to a method for obtaining an accurately determined high resistance in a resistor produced in a single crystalline substrate in the form of a diffused region limited in length, width and depth direction, which region is covered with an oxide layer and is provided with a first and a second window in the oxide layer for the connection of two terminal contacts.

In a heretofore common structure in which individual components in a transistor circuit are integrated in a single crystalline substrate, a P type silicon substrate is used, having an N type epitaxial layer grown on it and in which layer the components are produced and enclosed one by one within P type insulation frames which are diffused straight through the epitaxial layer and accordingly are in electric contact with the P type substrate. When the transistor circuit is operating a high-resistive insulation is obtained between the individual components because the P-N interface of the substrate and of the insulation frames towards the epitaxial layer is given a reverse bias.

Within an insulation frame an NPN-transistor can be produced by diffusing into the epitaxial layer a shallow P type region, into which then a smaller N type region is diffused, the N type epitaxial layer, the P type region, and the N type region located on the top of these forming collector, base and emitter electrode respectively in the NPN-transistor. A simple method of producing a circuit resistor is to diffuse within an insulation frame into the epitaxial layer a shallow P type region of the same kind as is used to form the base electrode of the NPN-transistor and to utilize the resistance between two points that are located at a distance from each other in that P type region.

The structure described above is economical from the point of view of manufacturing since the P type regions of the circuit resistances and of the base electrodes respectively in the NPN-transistors can be produced in one and the same diffusion step, the P type region being arranged with regard to the characteristics of the NPN-transistor in an epitaxial layer of suitably about 5 microns in thickness and being given a resistivity of typically 1000 ohm-mm$^2$ per meter.

The P type regions of the circuit resistances are given the form of a thin strip which is provided with two terminal contacts. For circuit resistances with high resistance values the width of the strip should be chosen as small as possible with regard to structural inhomogenities and optical reproduceability upon pattern-copying. Normally a strip width of about 10 microns is chosen. Furthermore the strip can suitably be given a reciprocating loop form within a rectangular area, an insulation distance of the same size as the strip width being chosen. It can now easily be computed from the abovementioned numerical values that a circuit resistance which is produced within an area of for example 0.2 × 0.2 mm cannot be given a greater resistance value than approximately 30,000 ohm.

According to a method proposed in the British Pat. No. 1,179,876 it is however possible to obtain a higher resistance value for the circuit resistance exemplified above by diffusing into the P type region of the same a smaller N type region in the same way as the emitter electrode of the NPN-transistor is produced. By this method an increase of resistance is obtained that is directly proportional to the effective reduction in depth direction of the P type region.

A great disadvantage of the proposed method is however that it is not possible to predetermine accurately the effective reduction of the depth of the P type region. The corresponding uncertainty in the determination of the final resistance value has the result that the method can only be used in those cases where comparatively wide tolerance intervals can be accepted. Although it is theoretically possible to produce the smaller N type region by means of a number of subsequent diffusion steps in order to increase the resistance value between the terminal contacts of the P type region which successively smaller and smaller partial amounts so as to approach with a desired degree of accuracy a determined resistance value the diffusion steps are too expensive in the process of manufacture to make it possible for this procedure to be applied.

The characteristics of the invention appear in the appended claims.

The invention will now be described more in detail with reference to the accompanying drawing where:

Figure 1:
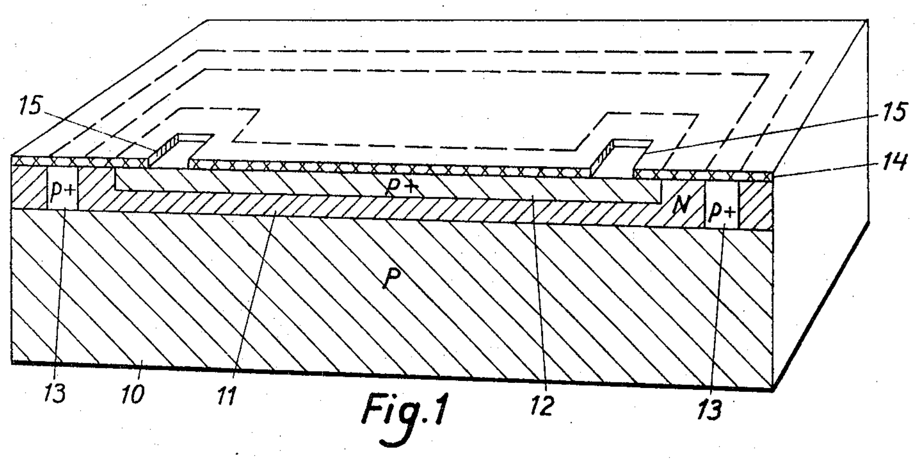
FIG. 1 shows a perspective view in section of a silicon substrate in which a resistor has been produced in a known structure.

In FIG. 1 a resistor is shown in a known structure in which a P type silicon substrate 10 has an N type epitaxial layer 11 grown on it, into which layer a shallow P type region 12 is diffused. The region 12 is surrounded by a likewise p type insulation frame 13 which is diffused straight through the epitaxial layer 11 in order to obtain electric contact with the substrate 10. An oxide layer 14 arranged on the top of the substrate 10 has two windows 15 for connection of terminal contacts to the region 12 that constitutes the resistance element of the resistor.

Figure 2:
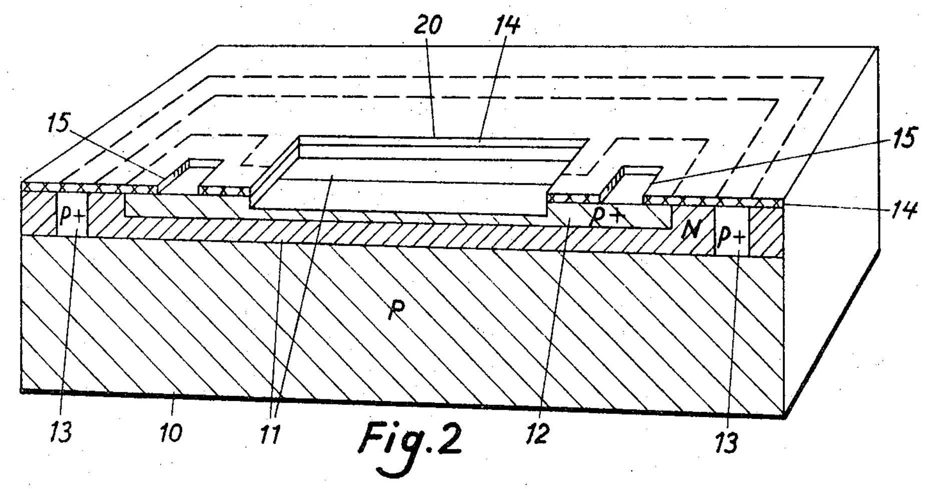
FIG. 2 shows the same silicon substrate as in FIG. 1 after the structure of the resistor has been changed by means of the method according to the invention.

In FIG. 2 is shown the known structure in FIG. 1 changed by means of the method according to the invention in order to achieve an accurately determined high resistance in the resistor. In principle the idea of the method is that a window 20 is made in the oxide layer 14 by means of a conventional photoresist and etching technique whereupon the P type region 12 located below the oxide layer 14 is being etched in depth direction through the window 20 for a predetermined time period during which such a quantity of material is removed so that the resistance of the quantity of material remaining in the region 12, measured between the windows 15, will equal a desired resistance value.

Figure 3:
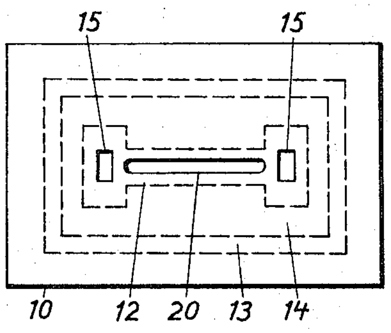
FIG. 3 and FIG. 4 show plan views of the resistor in the silicon substrate in two other embodiments according to the invention.
Figure 4:
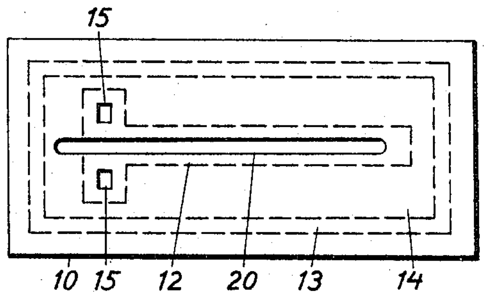

In FIG. 2 the window 20 covers the whole width of the region 12 and the greater part of its length between the windows 15. The method according to the invention can however with advantage also be applied in other embodiments in which the window 20 for example is given such a plane geometric pattern that upon the etching in depth direction of the region 12 there are formed in the same two thin resistance strips connected in parallel or in series as it is illustrated by the top plan view in FIG. 3 and FIG. 4 respectively. During the etching process the resistance between the windows 15 will increase towards a limited maximum value, in consequence of which it is achieved that the control of the time period of the etching process becomes much less critical and that the final resistance value consequently can be predetermined with greater certainty than what is the case in FIG. 2 where the final result becomes a resistive interruption if the etching is not interrupted in time.

The method according to the invention is in reality based on the realization of the fact that etching in the depth direction of the region 12 and the eventual forming of resistance strips in the same can be made with a considerably much greater precision than what can be obtained during the original diffusing of the region 12, and that etching consequently is a suitable technique in order to produce an accurately determined high resistance in a resistor in a single crystalline substrate. Since etching further is a simple and economic technique it is from the point of view of costs suitable also upon series manufacture for obtaining an exceptionally high accuracy in the final resistance value of the resistor by letting the removal of material from the diffused region 12 occur in steps by alternately etching the diffused region 12 and measuring the resistance value in order to bring the resistance between the windows 15 with successively smaller and smaller partial amounts nearer to the desired resistance value. The finally obtained resistance value is suitably stabilized against changes in time by coating the substrate 10 with silicon dioxide at a relatively low temperature in reactor in known manner.

By means of the method according to the invention an accurately determined increase of the resistance value can be obtained with a magnitude of 100 to maximally about 1,000 percent upon manufacture of especially resistors in the common range of 10 to 100 kiloohm according to the structure shown in FIG. 1, the saving of area in the silicon substrate being of the same magnitude.

We claim:

1. A method for obtaining an accurately determined high resistance in a resistor produced in a single crystalline substrate in the form of a diffused region, limited in length, width and depth direction, which region is covered with an oxide layer and is provided with a first and a second window in the oxide layer for connection of two terminal contacts, the method comprising the steps of making a third window in the oxide layer on the top of the diffused region, and then etching the diffused region in the depth direction through said third window for a determined time period, said determined time period being selected so that such a quantity of material is removed that the resistance of the quantity of material remaining in the diffused region, measured between the first and said second windows equals a predetermined resistance value.

2. The method according to claim 1 wherein said third window covers the entire width of the diffused region as well as the greater part of its length between the first and said second windows.

3. The method according to claim 1 wherein said third window has such a plane geometric pattern that upon the etching in the depth direction of the diffused region, a number of resistance strips connected in parallel between the first and said second window are formed.

4. The method according to claim 1 wherein said third window has such a plane geometric pattern that upon the etching in the depth direction of the diffused region, a number of resistance strips connected in series between the first and said second windows are formed.

5. The method according to claim 1 wherein the removal of material from the diffused region is made in steps by alternatively etching the diffused region and measuring the resistance value in order to bring the resistance between the first and said second windows with successively smaller and smaller partial amounts nearer to the predetermined resistance value, and when the finally obtained resistance value is attained stabilizing the resistor against changes in time by coating the substrate with silicon dioxide at a relatively low temperature.

* * * * *